US012433618B2

(12) United States Patent
Singh

(10) Patent No.: US 12,433,618 B2
(45) Date of Patent: Oct. 7, 2025

(54) ULTRASONIC CATHETER, DEVICE, AND SYSTEM

(71) Applicant: Bard Peripheral Vascular, Inc., M/C 110 IP Ops, NJ (US)

(72) Inventor: Aseem Singh, Tempe, AZ (US)

(73) Assignee: Bard Peripheral Vascular, Inc., Franklin Lakes, NJ (US)

( * ) Notice: Subject to any disclaimer, the term of this patent is extended or adjusted under 35 U.S.C. 154(b) by 559 days.

(21) Appl. No.: 17/995,437

(22) PCT Filed: Apr. 22, 2020

(86) PCT No.: PCT/US2020/029198
§ 371 (c)(1),
(2) Date: Oct. 4, 2022

(87) PCT Pub. No.: WO2021/216052
PCT Pub. Date: Oct. 28, 2021

(65) Prior Publication Data
US 2023/0172624 A1 Jun. 8, 2023

(51) Int. Cl.
*A61B 17/22* (2006.01)
(52) U.S. Cl.
CPC .... *A61B 17/2202* (2013.01); *A61B 2217/007* (2013.01)
(58) Field of Classification Search
CPC ........ A61B 17/22004; A61B 17/22012; A61B 17/320068; A61B 2017/22014;
(Continued)

(56) References Cited
U.S. PATENT DOCUMENTS 5,453,087 A 9/1995 Malinowski
6,942,677 B2 9/2005 Nita et al.
(Continued)

FOREIGN PATENT DOCUMENTS

JP 01094841 A 4/1989
JP 2008510573 A 4/2008
(Continued)

OTHER PUBLICATIONS

Japanese Office Action dated Jan. 4, 2024 pertaining to Japanese application No. 2022-564211 filed Oct. 21, 2022, pp. 1-7.
(Continued)

*Primary Examiner* — Todd J Scherbel
(74) *Attorney, Agent, or Firm* — Dinsmore & Shohl LLP

(57) ABSTRACT

An ultrasonic catheter includes a catheter sheath, an ultrasonic transmission member, and a catheter body. The ultrasonic transmission member extends within a lumen of the catheter sheath. The catheter body is coupled to the catheter sheath. The catheter body has a fluid inlet port and an inner cavity in fluid communication therewith. A plurality of O-ring members is disposed around and contacts a proximal portion of the ultrasonic transmission member. An O-ring housing is located in the inner cavity of the catheter body, which is configured to contain the plurality of O-ring members. A perimetrical fluid channel is defined between an outer surface of the O-ring housing and the catheter body. The O-ring housing is configured such that a heat dissipating fluid flows into the perimetrical fluid channel and across the outer surface of the O-ring housing to dissipate heat from the plurality of O-ring members.

20 Claims, 2 Drawing Sheets

(58) Field of Classification Search
CPC ......... A61B 2017/22015; A61B 2017/320069;
A61B 2017/320082; A61B 2017/320084;
A61B 2017/320088
See application file for complete search history.

(56) References Cited

U.S. PATENT DOCUMENTS

| | | |
|---|---|---|
| 7,540,852 B2 | 6/2009 | Nita et al. |
| 8,394,079 B2 | 3/2013 | Drake et al. |
| 8,657,844 B2 | 2/2014 | You et al. |
| 8,790,291 B2 | 7/2014 | Nita et al. |
| 9,126,012 B2 | 9/2015 | Mckinnon et al. |
| 9,238,130 B2 | 1/2016 | Mouri |
| 9,242,071 B2 | 1/2016 | Morgan et al. |
| 9,737,686 B2 | 8/2017 | Trainer et al. |
| 9,750,925 B2 | 9/2017 | Ma et al. |
| 9,872,973 B2 | 1/2018 | Matlock |
| 9,895,525 B2 | 2/2018 | Ma et al. |
| 2004/0167507 A1 | 8/2004 | Nita et al. |
| 2006/0047239 A1 | 3/2006 | Nita et al. |
| 2014/0171804 A1 | 6/2014 | Van Hoven |
| 2016/0199569 A1 | 7/2016 | Yevmenenko et al. |
| 2018/0256874 A1 | 9/2018 | Agrawal et al. |

FOREIGN PATENT DOCUMENTS

| | | |
|---|---|---|
| WO | 2006026507 A2 | 3/2006 |
| WO | 2019094028 A1 | 5/2019 |

OTHER PUBLICATIONS

International Search Report and Written Opinion dated Dec. 4, 2020, in International Application No. PCT/US2020/029198.

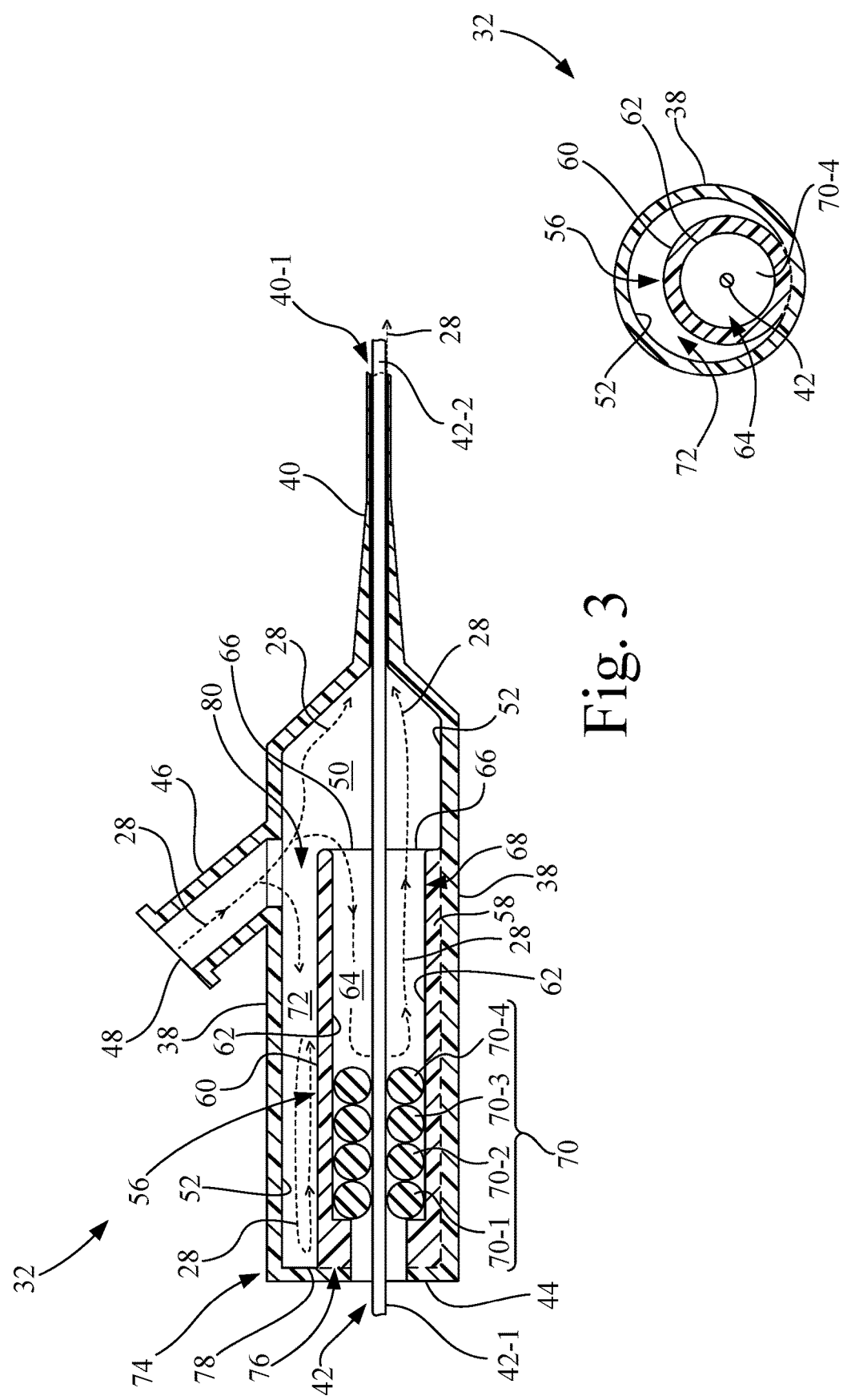

ULTRASONIC CATHETER, DEVICE, AND SYSTEM

CROSS-REFERENCE TO RELATED APPLICATIONS

This application is a U.S. National Phase of International Application No. PCT/US2020/029198, entitled "ULTRASONIC CATHETER, DEVICE, AND SYSTEM" and filed Apr. 22, 2020, which is incorporated herein by reference in its entirety.

TECHNICAL FIELD

The present invention relates to ultrasonic systems, and more particularly, to an ultrasonic catheter, device, and system, wherein the ultrasonic catheter is configured to dissipate heat in a region in close proximity to the ultrasonic transmission member, such as in the vicinity of a plurality of O-rings, i.e., vibration absorption members, that surround the ultrasonic transmission member of the ultrasonic catheter.

BACKGROUND ART

It is well known that an ultrasonic device may generate undesirable levels of heat during the generation of ultrasonic vibration. Some devices, such as an ultrasonic catheter, may include a body, e.g., a housing, which may include one or more surface features for increasing the overall surface area of the outer surface of the housing. This increase in surface area enhances the ability of the housing to dissipate heat generated by the ultrasonic wave guide (also sometimes referred to as an ultrasonic transmission member, such as a core wire) in the ultrasonic catheter body. Such surface features may have a suitable size or shape of ridges, jags, undulations, grooves, or the like. Additionally, the ultrasonic catheter body may be made of one or more heat dissipating materials, such as aluminum, stainless steel, any other conductive metal(s), or any suitable non-metallic conductive material(s). Still, heat buildup in the ultrasonic catheter body may occur in the vicinity of the ultrasonic transmission member, which could result in structural fatigue of the ultrasonic transmission member and/or of the components that are in close proximity to the ultrasonic transmission member.

What is needed in the art is an ultrasonic catheter, device, and system, wherein the ultrasonic catheter is configured to dissipate heat in a region in close proximity to the ultrasonic transmission member, such as in the vicinity of a plurality of O-rings, i.e., vibration absorption members, that surrounds the ultrasonic transmission member of the ultrasonic catheter.

SUMMARY OF INVENTION

The present invention provides an ultrasonic catheter, device, and system, wherein the ultrasonic catheter is configured to dissipate heat in a region in close proximity to the ultrasonic transmission member, such as in the vicinity of a plurality of O-rings, i.e., vibration absorption members, that surrounds the ultrasonic transmission member of the ultrasonic catheter.

The invention in one form is directed to an ultrasonic catheter that includes an elongate flexible catheter sheath, an ultrasonic transmission member, and a catheter body. The elongate flexible catheter sheath has a lumen. The ultrasonic transmission member extends longitudinally within the lumen of the elongate flexible catheter sheath. The ultrasonic transmission member has a proximal portion and a distal portion, wherein the proximal portion is configured to receive vibration energy. The catheter body is coupled to the elongate flexible catheter sheath. The catheter body has a fluid inlet port and an inner cavity in fluid communication with the fluid inlet port. The fluid inlet port is configured to facilitate passage of a heat dissipating fluid into the inner cavity. A plurality of O-ring members is disposed around and contacts the proximal portion of the ultrasonic transmission member. An O-ring housing is located in the inner cavity of the catheter body. The O-ring housing has an outer surface, an interior surface, and an O-ring cavity defined by the interior surface. The O-ring cavity is configured to contain the plurality of O-ring members. The ultrasonic transmission member extends through an entirety of the O-ring housing. A perimetrical fluid channel is defined between the outer surface of the O-ring housing and the catheter body. The O-ring housing is configured such that the heat dissipating fluid flows into the perimetrical fluid channel and across the outer surface of the O-ring housing to dissipate heat from the plurality of O-ring members.

The invention in another form is directed to an ultrasonic device including an ultrasonic transducer and an ultrasonic catheter. The ultrasonic catheter includes an elongate flexible catheter sheath having a lumen. An ultrasonic transmission member extends longitudinally within the lumen of the elongate flexible catheter sheath. The ultrasonic transmission member has a proximal portion and a distal portion. The proximal portion is configured for connection to the ultrasonic transducer. A catheter body is coupled to the elongate flexible catheter sheath. The catheter body has a fluid inlet port and an inner cavity in fluid communication with the fluid inlet port. The fluid inlet port is configured to facilitate passage of a heat dissipating fluid into the inner cavity. A plurality of O-ring members is disposed around and contacts the proximal portion of the ultrasonic transmission member. An O-ring housing is located in the inner cavity of the catheter body. The O-ring housing has an outer surface, an interior surface, and an O-ring cavity defined by the interior surface. The O-ring cavity is configured to contain the plurality of O-ring members, and wherein the ultrasonic transmission member extends through an entirety of the O-ring housing. A perimetrical fluid channel is defined between the outer surface of the O-ring housing and the catheter body. The O-ring housing is configured such that the heat dissipating fluid flows from the fluid inlet port into the perimetrical fluid channel and across the outer surface of the O-ring housing to dissipate heat from the plurality of O-ring members.

The invention in another form is directed to an ultrasonic system. The ultrasonic system includes a fluid source, an ultrasonic signal generator, an ultrasonic transducer, and an ultrasonic catheter. The fluid source is configured to supply a heat dissipating fluid. The ultrasonic signal generator is configured to generate an ultrasonic excitation signal. The ultrasonic transducer is electrically connected to the ultrasonic signal generator. The ultrasonic transducer is configured to receive the ultrasonic excitation signal and generate ultrasonic vibration energy. The ultrasonic catheter includes an elongate flexible catheter sheath having a lumen. An ultrasonic transmission member extends longitudinally within the lumen of the elongate flexible catheter sheath. The ultrasonic transmission member has a proximal portion and a distal portion. The proximal portion is mechanically connected to the ultrasonic transducer to receive the ultrasonic vibration energy. A catheter body is coupled to the elongate flexible catheter sheath. The catheter body has a fluid inlet port and an inner cavity in fluid communication with the fluid inlet port. The fluid inlet port is connected in fluid communication with the fluid source. The fluid inlet port is configured to facilitate passage of the heat dissipating fluid into the inner cavity. A plurality of O-ring members is disposed around and contacts the proximal portion of the ultrasonic transmission member. An O-ring housing is located in the inner cavity of the catheter body. The O-ring housing has an outer surface, an interior surface, and an O-ring cavity defined by the interior surface. The O-ring cavity is configured to contain the plurality of O-ring members. The ultrasonic transmission member extends through an entirety of the O-ring housing. A perimetrical fluid channel is defined between the outer surface of the O-ring housing and the catheter body. The O-ring housing is configured such that the heat dissipating fluid flows from the fluid inlet port into the perimetrical fluid channel and across the outer surface of the O-ring housing to dissipate heat from the plurality of O-ring members.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a section view of the ultrasonic catheter of FIGS. 1 and 2, taken along line 3-3 of FIG. 2; and FIG. 4 is a section view of the ultrasonic catheter of FIGS. 1-3, taken along line 4-4 of FIG. 1.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
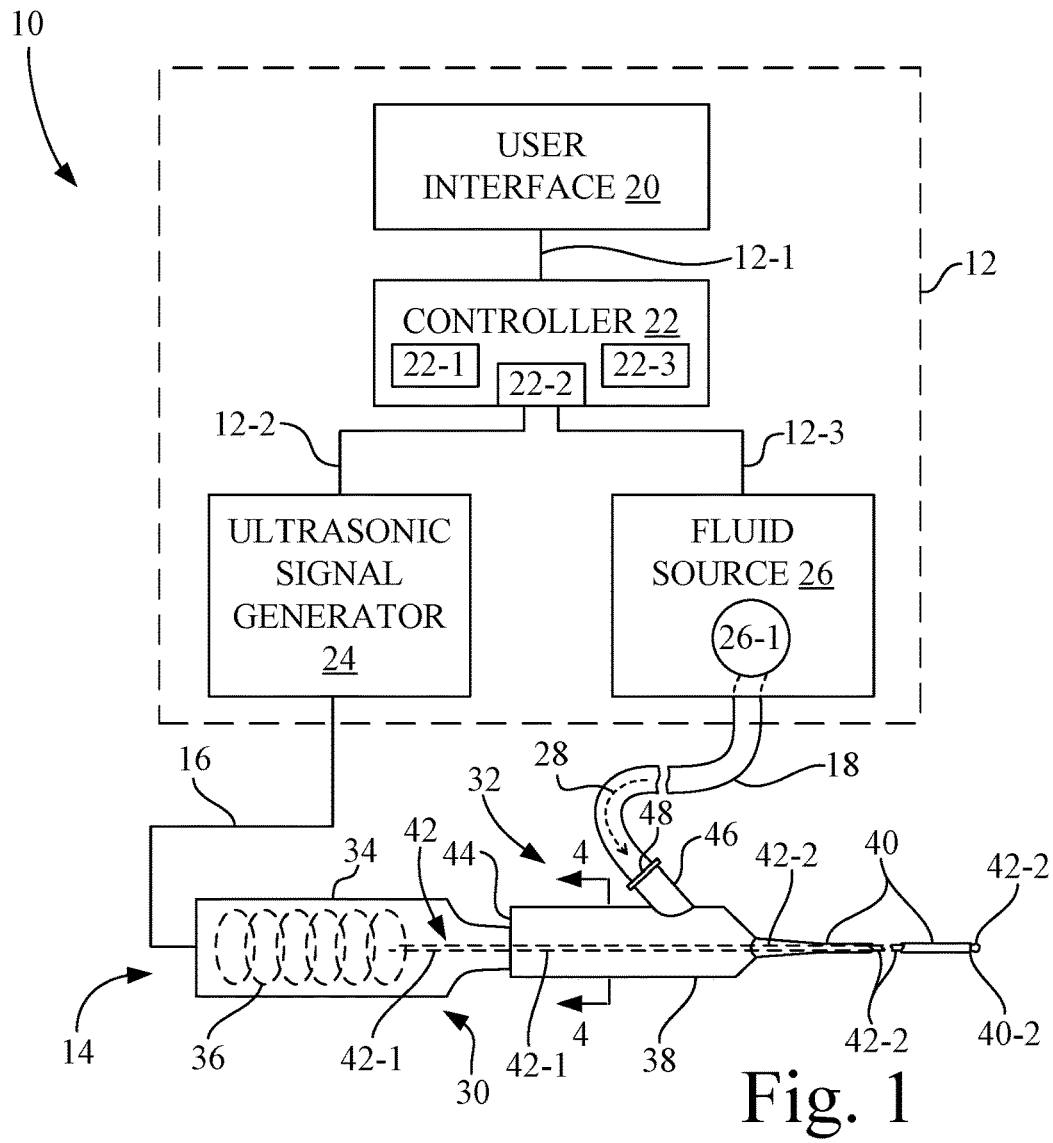
FIG. 1 is a schematic illustration of an ultrasonic system in accordance with an embodiment of the present invention, which includes a console, and an ultrasonic device that includes an ultrasonic catheter.

Referring now to the drawings, and more particularly to FIG. 1, there is shown a ultrasonic system 10 in accordance with an embodiment of the present invention. Ultrasonic system 10 generally includes a console 12 and an ultrasonic device 14. Ultrasonic device 14 may be used, for example, for interventional vascular occlusion or oncology procedures.

Console 12 is connected in electrical communication with ultrasonic device 14 via an electrical cable 16, e.g., a multi-conductor cable. Console 12 is connected in fluid communication with ultrasonic device 14 via a fluid conduit 18, e.g., a flexible tube or hose. Console 12 may include multiple components in a single housing unit or in separate housing units. In the present embodiment, console 12 may include a user interface 20, a controller 22, an ultrasonic signal generator 24, and a fluid source 26.

User interface 20 is connected to controller 22 via an electrical conductor 12-1, e.g., a multi-wire cable or USB, to provide electrical and communication interconnection. Alternatively, user interface 20 may be a wireless link, e.g., Bluetooth, which is communicatively coupled to controller 22. User interface 20 may include, for example, a touchscreen display and associated input and output processing circuitry. Touchscreen display may include, for example, a liquid crystal display (LCD) or a light-emitting diode (LED) display. Alternatively, user interface 20 may be in the form of a laptop computer or tablet. User interface 20 is configured to generate control signals based on user input. For example, a user may operate user interface 20 to provide the control signals to controller 22 to initiate and/or terminate operation of ultrasonic signal generator 24, and/or to selectively start, stop, or control the fluid feed rate of fluid source 26.

Controller 22 is electrically connected and communicatively coupled to user interface 20 via electrical conductor 12-1, e.g., a multi-wire cable or USB. Also, controller 22 is electrically connected and communicatively coupled to ultrasonic signal generator 24 via an electrical conductor 12-2, e.g., a multi-wire cable or USB, and controller 22 is electrically connected and communicatively coupled to fluid source 26 via an electrical conductor 12-3, e.g., a multi-wire cable or USB. Each of electrical conductors 12-2, 12-3 is configured to carry respective output control signals.

Controller 22 includes a processor circuit 22-1, interface circuitry 22-2, and an electronic memory circuit 22-3. Controller 22 executes program instructions to process signals received from user interface 20, executes program instructions to provide output control signals via interface circuit 22-2 to ultrasonic signal generator 24 to control the operation of ultrasonic signal generator 24, and executes program instructions to provide output control signals via interface circuit 22-2 to fluid source 26 to control the operation of fluid source 26.

Processor circuit 22-1 of controller 22 may include one or more programmable microprocessors and associated circuitry, such as an input/output interface, clock, buffers, memory, etc. Processor circuit 22-1 may be programmed, e.g., through software or firmware stored in electronic memory circuit 22-3, to execute program instructions to process received input data, and to generate and send output data to ultrasonic signal generator 24 and/or fluid source 26.

Interface circuitry 22-2 includes input and output circuits to facilitate electrical connection and data transfer with user interface 20, ultrasonic signal generator 24, and fluid source 26.

Electronic memory circuit 22-3 is an electronic non-transitory memory having a plurality of data storage locations, as is well known in the art. Electronic memory circuit 22-3 may be used, for example, to store program instructions to be executed by processor circuit 22-1 of controller 22 of console 12.

Ultrasonic signal generator 24 is typical of that known in the art, and may be controlled via user interface 20 and controller 22 to produce an ultrasonic electrical signal in the form of an ultrasonic excitation signal, e.g., in a frequency range of 20 kHz-40 kHz.

Fluid source 26 may be, for example, a saline injector, and includes a pump 26-1 that is configured to supply a heat dissipating fluid 28, e.g., sterile saline, to ultrasonic device 14. A secondary use of heat dissipating fluid 28 may be to flush a procedure area in the patient during a medical procedure. In FIGS. 1 and 3, heat dissipating fluid 28 is represented by dashed lines having arrowheads that demonstrate flow and flow direction.

As shown in FIG. 1, ultrasonic device 14 includes a handle 30 and an ultrasonic catheter 32. Handle 30 includes a housing 34 that contains an ultrasonic transducer 36 that is mounted internally to housing 34. Housing 34 has an outer shape and size to facilitate being grasped by an operator during a medical procedure, such as for example, a vascular occlusion or oncological related procedure.

Ultrasonic transducer 36 may be, for example, a piezo-electric-type transducer. Ultrasonic transducer 36 of handle 30 is electrically connected to ultrasonic signal generator 24 by electrical cable 16, and is configured to receive and convert the ultrasonic excitation signal generated by ultrasonic signal generator 24 into ultrasonic vibrational energy, which may be in a frequency range corresponding to that of the ultrasonic excitation signal generated by ultrasonic signal generator 24. For example, if the frequency of the ultrasonic excitation signal generated by ultrasonic signal generator 24 and supplied to ultrasonic transducer 36 is 20 kHz, then the vibrational frequency of the output of ultrasonic transducer 36 correspondingly may be 20 kHz.

Ultrasonic catheter 32 is mechanically connected to housing 34 of handle 30 of ultrasonic device 14. The connection of ultrasonic catheter 32 to housing 34 of handle 30 may be a releasable connection (i.e., temporary), or alternatively, may be fixed connection (i.e., permanent). In a case wherein ultrasonic device 14 is intended to be fully disposable, then ultrasonic catheter 32 may be permanently attached to handle 30, e.g., by overmold, weld, or adhesive. However, if it is desired that handle 30 of ultrasonic device 14 be reusable, then ultrasonic catheter 32 may be made to be releasably attachable to handle 30, e.g., by a screw coupling or snap connection.

Figure 2:
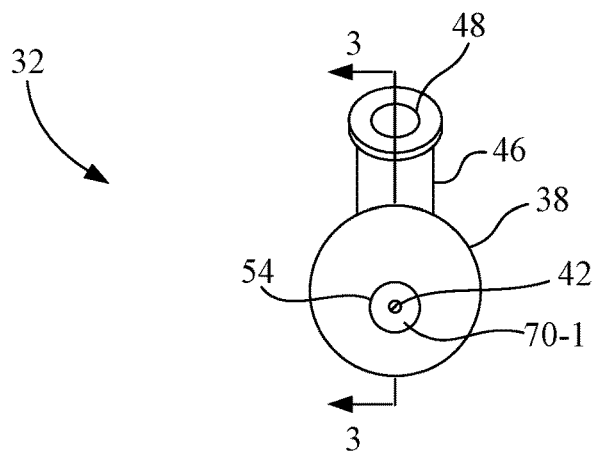
FIG. 2 is an end view of the ultrasonic catheter of FIG. 1, with the ultrasonic transmission member being sectioned at the end wall of the catheter body.

Referring also to FIGS. 2-4, ultrasonic catheter 32 includes a catheter body 38, an elongate flexible catheter sheath 40, and an ultrasonic transmission member 42. Elongate flexible catheter sheath 40 distally extends from catheter body 38. Elongate flexible catheter sheath 40 includes an elongate longitudinally extending lumen 40-1 that carries a portion of ultrasonic transmission member 42. Optionally and alternatively, ultrasonic transmission member 42 may be a component of handle 30.

Ultrasonic transmission member 42 is located in, and longitudinally extends, through catheter body 38 and within (e.g., through) lumen 40-1 of elongate flexible catheter sheath 40. Ultrasonic transmission member 42 has a proximal portion 42-1 and a distal portion 42-2 that is longitudinally spaced apart from the proximal portion 42-1. In the present embodiment, proximal portion 42-1 of ultrasonic transmission member 42 is that portion of ultrasonic transmission member 42 that resides in housing 34 and catheter body 38. Distal portion 42-2 of ultrasonic transmission member 42 is that portion of ultrasonic transmission member 42 that is distal to proximal portion 42-1, e.g., that resides in elongate flexible catheter sheath 40, e.g., distal to catheter body 38.

Proximal portion 42-1 of the ultrasonic transmission member 42 is configured to receive vibration energy from ultrasonic transducer 36. For example, proximal portion 42-1 of the ultrasonic transmission member 42 may be mechanically connected to ultrasonic transducer 36, e.g., by a sonic connector, to receive the vibrational energy from ultrasonic transducer 36 so as to produce a vibrational motion of ultrasonic transmission member 42. Thus, ultrasonic transducer 36 generates vibratory energy at a vibratory energy level corresponding to the electrical energy output level of the ultrasonic excitation signal generated by ultrasonic signal generator 24. Ultrasonic transmission member 42 may be in the form of an elongate flexible metal wire, e.g., a nitinol wire, which is sometimes also referred to in the art as a core wire.

In the present embodiment, for example, catheter body 38 may be made from a rigid or semi-rigid material, such as plastic or other polymer; however optionally, catheter body 38 may include metal, in whole or in part. Elongate flexible catheter sheath 40 may made from a flexible biocompatible material, such as a flexible polymer, which may optionally include structural reinforcement, such as an elongate metal coil. Catheter body 38 is coupled, e.g., fixedly connected, to elongate flexible catheter sheath 40, e.g., via overmold, weld, or adhesive, to form a single-piece unitary structure.

Catheter body 38 is proximal to, and connected with, elongate flexible catheter sheath 40. Catheter body 38 includes an end wall 44, a Y-connector tube 46, a fluid inlet port 48, an inner cavity 50, and an inner surface 52. As shown in FIG. 2, end wall 44 of catheter body 38 includes an opening 54 sized to receive ultrasonic transmission member 42 without contacting ultrasonic transmission member 42.

In the present embodiment, with reference to FIGS. 1-3, fluid inlet port 48 is defined by Y-connector tube 46 of catheter body 38. Fluid inlet port 48 is coupled in fluid communication with inner cavity 50, and inner cavity 50 is coupled in fluid communication with lumen 40-1 of elongate flexible catheter sheath 40. Y-connector tube 46 and fluid input port 38-2 are configured, e.g., with a Luer-type connector, to be connected by fluid conduit 18 to pump 26-1 of fluid source 26. Also, fluid inlet port 48 is configured, e.g. as a cylindrical void, to facilitate passage of heat dissipating fluid 28 into the inner cavity 50 of catheter body 38.

Referring to FIGS. 3 and 4, located within catheter body 38 is an O-ring housing 56. More particularly, O-ring housing 56 is located in inner cavity 50 of catheter body 38. As shown in FIG. 4, in the present embodiment, catheter body 38 is formed as a cylinder having an inside diameter at inner surface 52, and O-ring housing 56 is formed as a second cylinder having an outside diameter at an outer surface 60 of O-ring housing 56, wherein the outside diameter of O-ring housing 56 is smaller than the inside diameter of catheter body 38. Also, in the present embodiment, catheter body 38 and O-ring housing 56 may be arranged as non-concentric cylinders, wherein a longitudinal portion 58 of outer surface 60 of O-ring housing 56 is joined, e.g., by molding, weld, or adhesive, to inner surface 52 of catheter body 38.

O-ring housing 56 further includes an interior surface 62, and an O-ring cavity 64 defined by interior surface 62. In the present embodiment, O-ring housing 56 is configured as a cylinder having a bore, wherein the bore is configured to define interior surface 62 of O-ring housing 56. Also, O-ring housing 56 has a distal open end 66, and a distal inner perimetrical portion 68 proximal to distal open end 66.

O-ring cavity 64 is configured to receive and contain a plurality of O-ring members 70, which in the present embodiment are individually identified as O-ring member 70-1, O-ring member 70-2, O-ring member 70-3, and O-ring member 70-4. In the present embodiment, the term "O-ring" is an annular member configured to absorb vibration, wherein the definition includes both a traditional O-ring configuration and an elongate annular sleeve. For example, each of the plurality of O-ring members 70 may be made from an elastomeric material, such as rubber. As an alternative to the present embodiment, it is contemplated that some or all of the plurality of O-ring members 70 may be fused together, or may be replaced with one or more sleeve-like annular members.

Referring to FIGS. 2-4, ultrasonic transmission member 42 extends through an entirety of O-ring housing 56, and more particularly, through the centers of the plurality of O-ring members 70 positioned in the O-ring cavity 64 of O-ring housing 56. As such, the plurality of O-ring members 70 is disposed around and contacts proximal portion 42-1 of the ultrasonic transmission member 42. The plurality of O-ring members 70 is configured to form a fluid seal in O-ring cavity 64 of O-ring housing 56 between the ultrasonic transmission member 42 and interior surface 62 of O-ring housing 56, such that none of heat dissipating fluid 28 escapes from opening 54 of end wall 44 of catheter body 38 (see FIG. 2).

Referring to FIGS. 3 and 4, a perimetrical fluid channel 72 is defined between outer surface 60 of O-ring housing 56 and inner surface 52 of catheter body 38. In the present embodiment, wherein catheter body 38 and O-ring housing 56 are arranged as non-concentric cylinders, then perimetrical fluid channel 72 substantially surrounds O-ring housing 56 to form a semi-annular fluid channel having a crescent shape in cross-section (see FIG. 4) that longitudinally extends a length of O-ring housing 56 (see also FIG. 3). End wall 44 of catheter body 38 is configured to extend from a back portion 74 of catheter body 38 to a back portion 76 of O-ring housing 56 so as to define a closed proximal end 78 of perimetrical fluid channel 72.

While in the present embodiment catheter body 38 and O-ring housing 56 are arranged as joined non-concentric cylinders, in an alternative arrangement, O-ring housing 56 may be radially spaced from catheter body 38 such that perimetrical fluid channel 72 forms an annular channel that surrounds an entire perimeter of O-ring housing 56.

In accordance with the present invention, fluid inlet port 48 of catheter body 38 is configured to receive heat dissipating fluid 28 from fluid source 26. The flow of heat dissipating fluid 28 received by fluid inlet port 48 is supplied into inner cavity 50 of catheter body 38. O-ring housing 56 is configured such that at least a portion of the heat dissipating fluid 28 that flows into inner cavity 50 of catheter body 38 will in turn flow into an open distal end 80 of perimetrical fluid channel 72 and across outer surface 60 of O-ring housing 56, so as to dissipate heat from (i.e., cool) O-ring housing 56, the plurality of O-ring members 70 contained in O-ring housing 56, and proximal portion 42-1 of ultrasonic transmission member 42, when ultrasonic transmission member 42 has generated heat during ultrasonic vibration.

Also, O-ring housing 56 is configured such that at least a portion of the heat dissipating fluid 28 that flows into inner cavity 50 of catheter body 38 will in turn flow into O-ring cavity 64 and across distal inner perimetrical portion 68 of interior surface 62 of O-ring housing 56 and directly against O-ring member 70-4, so as to dissipate heat from O-ring housing 56, the plurality of O-ring members 70 contained in O-ring housing 56, and proximal portion 42-1 of ultrasonic transmission member 42, when ultrasonic transmission member 42 has generated heat during ultrasonic vibration.

Referring to FIGS. 1 and 2, at least a portion of the heat dissipating fluid 28 that flows into open distal end 80 of perimetrical fluid channel 72 and across outer surface 60 of O-ring housing 56, and that flows into O-ring cavity 64 and across distal inner perimetrical portion 68 of interior surface 62, will circulate within inner cavity 50 of catheter body 38 and then may be ejected from a distal end portion 40-2 of elongate flexible catheter sheath 40. For example, catheter body 38 also is configured such that at least a portion of heat dissipating fluid 28 supplied by fluid source 26 that flows into inner cavity 50 of catheter body 38 will in turn flow into lumen 40-1 of elongate flexible catheter sheath 40, so as to provide cooling of distal portion 42-2 of ultrasonic transmission member 42, and then exit ultrasonic catheter 32 from distal end portion 40-2 of elongate flexible catheter sheath 40.

The following items also relate to the invention:

In one form, the invention relates to an ultrasonic catheter that includes an elongate flexible catheter sheath, an ultrasonic transmission member, and a catheter body. The elongate flexible catheter sheath has a lumen. The ultrasonic transmission member extends longitudinally within the lumen of the elongate flexible catheter sheath. The ultrasonic transmission member has a proximal portion and a distal portion, wherein the proximal portion is configured to receive (ultrasonic) vibration energy. The catheter body is coupled to the elongate flexible catheter sheath. The catheter body has a fluid inlet port and an inner cavity in fluid communication with the fluid inlet port. The fluid inlet port is configured to facilitate passage of a heat dissipating fluid into the inner cavity. A plurality of O-ring members is disposed around and contacts the proximal portion of the ultrasonic transmission member and may be configured to absorb vibration energy from the ultrasonic transmission member. An O-ring housing is located in the inner cavity of the catheter body. The O-ring housing has an outer surface, an interior surface, and an O-ring cavity defined by the interior surface. The O-ring cavity is configured to contain (contains) the plurality of O-ring members. The ultrasonic transmission member may extend through an entirety of the O-ring housing. A perimetrical fluid channel (which may be regarded as a fluid channel which extends at least partially along the perimeter of the catheter body) is defined between the outer surface of the O-ring housing and the catheter body. The O-ring housing (the ultrasonic catheter) is configured such that the heat dissipating fluid flows into the perimetrical fluid channel and/or across the outer surface of the O-ring housing to dissipate heat from the plurality of O-ring members.

In accordance with some embodiments, the O-ring housing (the ultrasonic catheter) further may be configured such that the heat dissipating fluid flows into the O-ring cavity and across a distal inner perimetrical portion of the interior surface of the O-ring housing.

In accordance with any of the embodiments, the plurality of O-ring members is configured to form a fluid seal in the O-ring cavity of the O-ring housing between the ultrasonic transmission member and the interior surface of the O-ring housing.

In accordance with some embodiments, the O-ring housing optionally may be configured as a cylinder that has a bore, wherein the bore is configured to define the interior surface of the O-ring housing that defines the O-ring cavity, and wherein the perimetrical fluid channel is a semi-annular fluid channel.

In accordance with some embodiments, the O-ring housing may have a distal open end.

In accordance with some embodiments, the ultrasonic catheter may further comprise an end wall configured to extend from a (first) back portion of the catheter body to a (second) back portion of the O-ring housing to define a closed proximal end of the perimetrical fluid channel.

In accordance with some embodiments, optionally, the perimetrical fluid channel (also a semi-annular fluid channel) may be crescent shaped in cross-section.

In another form, the invention relates to an ultrasonic device that may include an ultrasonic transducer and an ultrasonic catheter. Optionally, the ultrasonic catheter may be the ultrasonic catheter of any of the preceding paragraphs [0044] to [0050]. The ultrasonic catheter includes an elongate flexible catheter sheath that has a lumen. An ultrasonic transmission member extends longitudinally within the lumen of the elongate flexible catheter sheath. The ultrasonic transmission member has a proximal portion and a distal portion. The proximal portion is configured for connection (connected) to the ultrasonic transducer (for receiving (ultrasonic) vibration energy). A catheter body is coupled to the elongate flexible catheter sheath. The catheter body has a fluid inlet port and an inner cavity in fluid communication with the fluid inlet port. The fluid inlet port is configured to facilitate passage of a heat dissipating fluid into the inner cavity. A plurality of O-ring members is disposed around and contacts the proximal portion of the ultrasonic transmission member and may be configured to absorb vibration energy from the ultrasonic transmission member. An O-ring housing is located in the inner cavity of the catheter body. The O-ring housing has an outer surface, an interior surface, and an O-ring cavity defined by the interior surface. The O-ring cavity is configured to contain (contains) the plurality of O-ring members, and wherein the ultrasonic transmission member may extend through an entirety of the O-ring housing. A perimetrical fluid channel (which may be regarded as a fluid channel which extends at least partially along the perimeter of the catheter body) is defined between the outer surface of the O-ring housing and the catheter body. The O-ring housing (the ultrasonic catheter) is configured such that the heat dissipating fluid flows from the fluid inlet port into the perimetrical fluid channel and/or across the outer surface of the O-ring housing to dissipate heat from the plurality of O-ring members.

In accordance with some embodiments, the O-ring housing (the ultrasonic catheter) further may be configured such that the heat dissipating fluid flows from the fluid inlet port into the O-ring cavity and across a distal inner perimetrical portion of the interior surface of the O-ring housing.

In accordance with any of the embodiments, the plurality of O-ring members is configured to form a fluid seal in the O-ring cavity of the O-ring housing between the ultrasonic transmission member and the interior surface of the O-ring housing.

In accordance with some embodiments, the O-ring housing optionally may be configured as a cylinder that has a bore, wherein the bore may be configured to define the interior surface of the O-ring housing that defines the O-ring cavity.

In accordance with some embodiments, the O-ring housing may have a distal open end.

In accordance with some embodiments, the ultrasonic catheter may further comprise an end wall that is configured to extend from a (first) back portion of the catheter body to a (second) back portion of the O-ring housing to define a closed proximal end of the perimetrical fluid channel.

Optionally, the perimetrical fluid channel (also a semi-annular fluid channel) may be crescent shaped in cross-section.

In another form, the invention relates to ultrasonic system. The ultrasonic system may include a fluid source, an ultrasonic signal generator, an ultrasonic transducer, and an ultrasonic catheter. Optionally, the ultrasonic catheter may be the ultrasonic catheter of any of the preceding paragraphs [0044] to [0050]. The ultrasonic device of any of the preceding paragraphs [0051] to [0057] may be comprised in the ultrasonic system. The fluid source is configured to supply a heat dissipating fluid. The ultrasonic signal generator is configured to generate an ultrasonic excitation signal. The ultrasonic transducer is electrically connected to the ultrasonic signal generator. The ultrasonic transducer is configured to receive the ultrasonic excitation signal and generate ultrasonic vibration energy. The ultrasonic catheter includes an elongate flexible catheter sheath that has a lumen. An ultrasonic transmission member extends longitudinally within the lumen of the elongate flexible catheter sheath. The ultrasonic transmission member has a proximal portion and a distal portion. The proximal portion is (configured to be) mechanically connected to the ultrasonic transducer (and configured) to receive the ultrasonic vibration energy. A catheter body is coupled to the elongate flexible catheter sheath. The catheter body has a fluid inlet port and an inner cavity in fluid communication with the fluid inlet port. The fluid inlet port is connected in fluid communication with the fluid source. The fluid inlet port is configured to facilitate passage of the heat dissipating fluid into the inner cavity. A plurality of O-ring members is disposed around and contacts the proximal portion of the ultrasonic transmission member and may be configured absorb vibration energy from the ultrasonic transmission member. An O-ring housing is located in the inner cavity of the catheter body. The O-ring housing has an outer surface, an interior surface, and an O-ring cavity defined by the interior surface. The O-ring cavity is configured to contain (contains) the plurality of O-ring members. The ultrasonic transmission member may extend through an entirety of the O-ring housing. A perimetrical fluid channel (which may be regarded as a fluid channel which extends at least partially along the perimeter of the catheter body) is defined between the outer surface of the O-ring housing and the catheter body. The O-ring housing (the ultrasonic catheter) is configured such that the heat dissipating fluid flows from the fluid inlet port into the perimetrical fluid channel and/or across the outer surface of the O-ring housing to dissipate heat from the plurality of O-ring members.

In accordance with some embodiments, the O-ring housing (the ultrasonic catheter) further may be configured such that the heat dissipating fluid flows from the fluid inlet port into the O-ring cavity and across a distal inner perimetrical portion of the interior surface of the O-ring housing.

In accordance with any of the embodiments, the plurality of O-ring members is configured to form a fluid seal in the O-ring cavity of the O-ring housing between the ultrasonic transmission member and the interior surface of the O-ring housing.

In accordance with some embodiments, the O-ring housing optionally may be configured as a cylinder that has a bore, wherein the bore is configured to define the interior surface of the O-ring housing that defines the O-ring cavity.

In accordance with some embodiments, the O-ring housing may have a distal open end.

In accordance with some embodiments, the ultrasonic catheter may further comprise an end wall configured to extend from a (first) back portion of the catheter body to a (second) back portion of the O-ring housing to define a closed proximal end of the perimetrical fluid channel.

In accordance with some embodiments, optionally, the perimetrical fluid channel may be a semi-annular fluid channel that has a crescent shape in cross-section.

As used herein, any terms of degree, such as substantially, are relative modifiers intended to indicate permissible variation from the characteristic so modified. Such terms are not intended to be limited to the absolute value of the characteristic which it modifies, but rather possessing more of the physical or functional characteristic than the opposite.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ultrasonic catheter, comprising:
    an elongate flexible catheter sheath having a lumen;
    an ultrasonic transmission member extending longitudinally within the lumen of the elongate flexible catheter sheath, the ultrasonic transmission member having a proximal portion and a distal portion, the proximal portion configured to receive vibration energy;
    a catheter body coupled to the elongate flexible catheter sheath, the catheter body having a fluid inlet port and an inner cavity in fluid communication with the fluid inlet port, the fluid inlet port configured to facilitate passage of a heat dissipating fluid into the inner cavity;
    a plurality of O-ring members disposed around and contacting the proximal portion of the ultrasonic transmission member;
    an O-ring housing located in the inner cavity of the catheter body, the O-ring housing having an outer surface, an interior surface, and an O-ring cavity defined by the interior surface, the O-ring cavity configured to contain the plurality of O-ring members, and wherein the ultrasonic transmission member extends through an entirety of the O-ring housing; and
    a perimetrical fluid channel defined between the outer surface of the O-ring housing and the catheter body, and the O-ring housing configured such that the heat dissipating fluid flows into the perimetrical fluid channel and across the outer surface of the O-ring housing to dissipate heat from the plurality of O-ring members.

2. The ultrasonic catheter according to claim 1, wherein the O-ring housing is configured such that the heat dissipating fluid flows into the O-ring cavity and across a distal inner perimetrical portion of the interior surface of the O-ring housing.

3. The ultrasonic catheter according to claim 1, wherein the plurality of O-ring members is configured to form a fluid seal in the O-ring cavity of the O-ring housing between the ultrasonic transmission member and the interior surface of the O-ring housing.

4. The ultrasonic catheter according to claim 1, wherein the O-ring housing is configured as a cylinder having a bore, wherein the bore is configured to define the interior surface of the O-ring housing that defines the O-ring cavity, and wherein the perimetrical fluid channel is a semi-annular fluid channel.

5. The ultrasonic catheter according claim 1, wherein the O-ring housing has a distal open end.

6. The ultrasonic catheter according claim 1, comprising an end wall configured to extend from a first back portion of the catheter body to a second back portion of the O-ring housing to define a closed proximal end of the perimetrical fluid channel.

7. The ultrasonic catheter according to claim 1, wherein in cross-section the perimetrical fluid channel is crescent shaped.

8. An ultrasonic device, comprising:
    an ultrasonic transducer; and
    an ultrasonic catheter that comprises:
        an elongate flexible catheter sheath having a lumen;
        an ultrasonic transmission member extending longitudinally within the lumen of the elongate flexible catheter sheath, the ultrasonic transmission member having a proximal portion and a distal portion, the proximal portion configured for connection to the ultrasonic transducer;
        a catheter body coupled to the elongate flexible catheter sheath, the catheter body having a fluid inlet port and an inner cavity in fluid communication with the fluid inlet port, the fluid inlet port configured to facilitate passage of a heat dissipating fluid into the inner cavity;
        a plurality of O-ring members disposed around and contacting the proximal portion of the ultrasonic transmission member;
        an O-ring housing located in the inner cavity of the catheter body, the O-ring housing having an outer surface, an interior surface, and an O-ring cavity defined by the interior surface, the O-ring cavity configured to contain the plurality of O-ring members, and wherein the ultrasonic transmission member extends through an entirety of the O-ring housing; and
        a perimetrical fluid channel defined between the outer surface of the O-ring housing and the catheter body, and the O-ring housing configured such that the heat dissipating fluid flows from the fluid inlet port into the perimetrical fluid channel and across the outer surface of the O-ring housing to dissipate heat from the plurality of O-ring members.

9. The ultrasonic device according to claim 8, wherein the O-ring housing is configured such that the heat dissipating fluid flows from the fluid inlet port into the O-ring cavity and across a distal inner perimetrical portion of the interior surface of the O-ring housing.

10. The ultrasonic device according to claim 8, wherein the plurality of O-ring members is configured to form a fluid seal in the O-ring cavity of the O-ring housing between the ultrasonic transmission member and the interior surface of the O-ring housing.

11. The ultrasonic device according to claim 8, wherein the O-ring housing is configured as a cylinder having a bore, wherein the bore is configured to define the interior surface of the O-ring housing that defines the O-ring cavity.

12. The ultrasonic device according to claim 8, wherein the O-ring housing has a distal open end.

13. The ultrasonic device according to claim 8, comprising an end wall configured to extend from a first back portion of the catheter body to a second back portion of the O-ring housing to define a closed proximal end of the perimetrical fluid channel.

14. An ultrasonic system, comprising:
    a fluid source configured to supply a heat dissipating fluid;
    an ultrasonic signal generator configured to generate an ultrasonic excitation signal;
    an ultrasonic transducer electrically connected to the ultrasonic signal generator, the ultrasonic transducer configured to receive the ultrasonic excitation signal and generate ultrasonic vibration energy; and an ultrasonic catheter that comprises:
- an elongate flexible catheter sheath having a lumen;
- an ultrasonic transmission member extending longitudinally within the lumen of the elongate flexible catheter sheath, the ultrasonic transmission member having a proximal portion and a distal portion, the proximal portion mechanically connected to the ultrasonic transducer to receive the ultrasonic vibration energy;
- a catheter body coupled to the elongate flexible catheter sheath, the catheter body having a fluid inlet port and an inner cavity in fluid communication with the fluid inlet port, the fluid inlet port being connected in fluid communication with the fluid source, the fluid inlet port being configured to facilitate passage of the heat dissipating fluid into the inner cavity;
- a plurality of O-ring members disposed around and contacting the proximal portion of the ultrasonic transmission member;
- an O-ring housing located in the inner cavity of the catheter body, the O-ring housing having an outer surface, an interior surface, and an O-ring cavity defined by the interior surface, the O-ring cavity configured to contain the plurality of O-ring members, and wherein the ultrasonic transmission member extends through an entirety of the O-ring housing; and
- a perimetrical fluid channel defined between the outer surface of the O-ring housing and the catheter body, and the O-ring housing configured such that the heat dissipating fluid flows from the fluid inlet port into the perimetrical fluid channel and across the outer surface of the O-ring housing to dissipate heat from the plurality of O-ring members.

15. The ultrasonic system according to claim 14, wherein the O-ring housing is configured such that the heat dissipating fluid flows from the fluid inlet port into the O-ring cavity and across a distal inner perimetrical portion of the interior surface of the O-ring housing.

16. The ultrasonic system according to claim 14, wherein the plurality of O-ring members is configured to form a fluid seal in the O-ring cavity of the O-ring housing between the ultrasonic transmission member and the interior surface of the O-ring housing.

17. The ultrasonic system according to claim 14, wherein the O-ring housing is configured as a cylinder having a bore, wherein the bore is configured to define the interior surface of the O-ring housing that defines the O-ring cavity.

18. The ultrasonic system according to claim 14, wherein the O-ring housing has a distal open end.

19. The ultrasonic system according claim 14, comprising an end wall configured to extend from a first back portion of the catheter body to a second back portion of the O-ring housing to define a closed proximal end of the perimetrical fluid channel.

20. The ultrasonic system according to claim 14, wherein the perimetrical fluid channel is a semi-annular fluid channel having a crescent shape in cross-section.

\* \* \* \* \*